United States Patent [19]

Avicola et al.

[11] 4,206,347

[45] Jun. 3, 1980

[54] ACOUSTO-OPTIC MULTIPLEXING AND DEMULTIPLEXING

[75] Inventors: Kenneth Avicola; Robert S. Congleton, both of Richland; Gay W. Hong, Kennewick, all of Wash.

[73] Assignee: Jersey Nuclear-Avco Isotopes, Inc., Bellevue, Wash.

[21] Appl. No.: 868,842

[22] Filed: Jan. 12, 1978

[51] Int. Cl.$^2$ .............................................. H04B 9/00
[52] U.S. Cl. .................................. 455/608; 350/174; 350/358; 370/4; 455/609
[58] Field of Search .................. 250/199; 350/358, 174

[56] References Cited

U.S. PATENT DOCUMENTS

| | | | |
|---|---|---|---|
| 3,759,603 | 9/1973 | Eschler | 350/358 |
| 3,825,845 | 7/1974 | Angelbeck | 250/199 |
| 3,845,294 | 10/1974 | Indig | 250/199 |
| 3,849,604 | 11/1974 | Benes | 250/199 |
| 3,869,197 | 3/1975 | Owens | 350/358 |
| 3,873,825 | 3/1975 | Jones | 250/199 |

*Primary Examiner*—Howard W. Britton
*Attorney, Agent, or Firm*—Weingarten, Maxham & Schurgin

[57] ABSTRACT

A system for multiplexing or demultiplexing pulsed laser radiation having an acousto-optical device which is electrically controlled to switch a common path of high pulse rate laser radiation between a plurality of spatially distinct paths for relatively lower pulse rate laser radiation at which the pulses are sequenced according to a predetermined time pattern. The acousto-optical element typically includes a Bragg cell which is electrically driven by a set of distinct frequencies, causing deflection of radiation passing therethrough at a predetermined set of angles whereby pulsed radiation on a single path may be distributed onto the plural separate paths or radiation on plural separate paths of time-sequenced pulses of radiation can be combined into a single path of augmented pulse rate. The control of the acousto-optical element may be provided by selectively switching the output of a plurality of fixed frequency oscillators of different frequency to the acousto-optical element in accordance with the pattern of pulses on the common or plural distinct paths or a voltage-controlled oscillator may be sequenced through a repeating set of frequencies which are sampled one or more times per sequence to develop an error signal resulting in feedback control over the oscillator to eliminate long-term drift.

15 Claims, 6 Drawing Figures

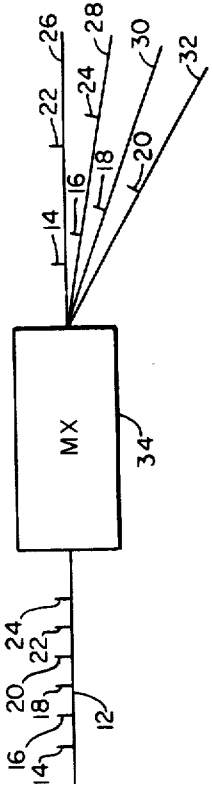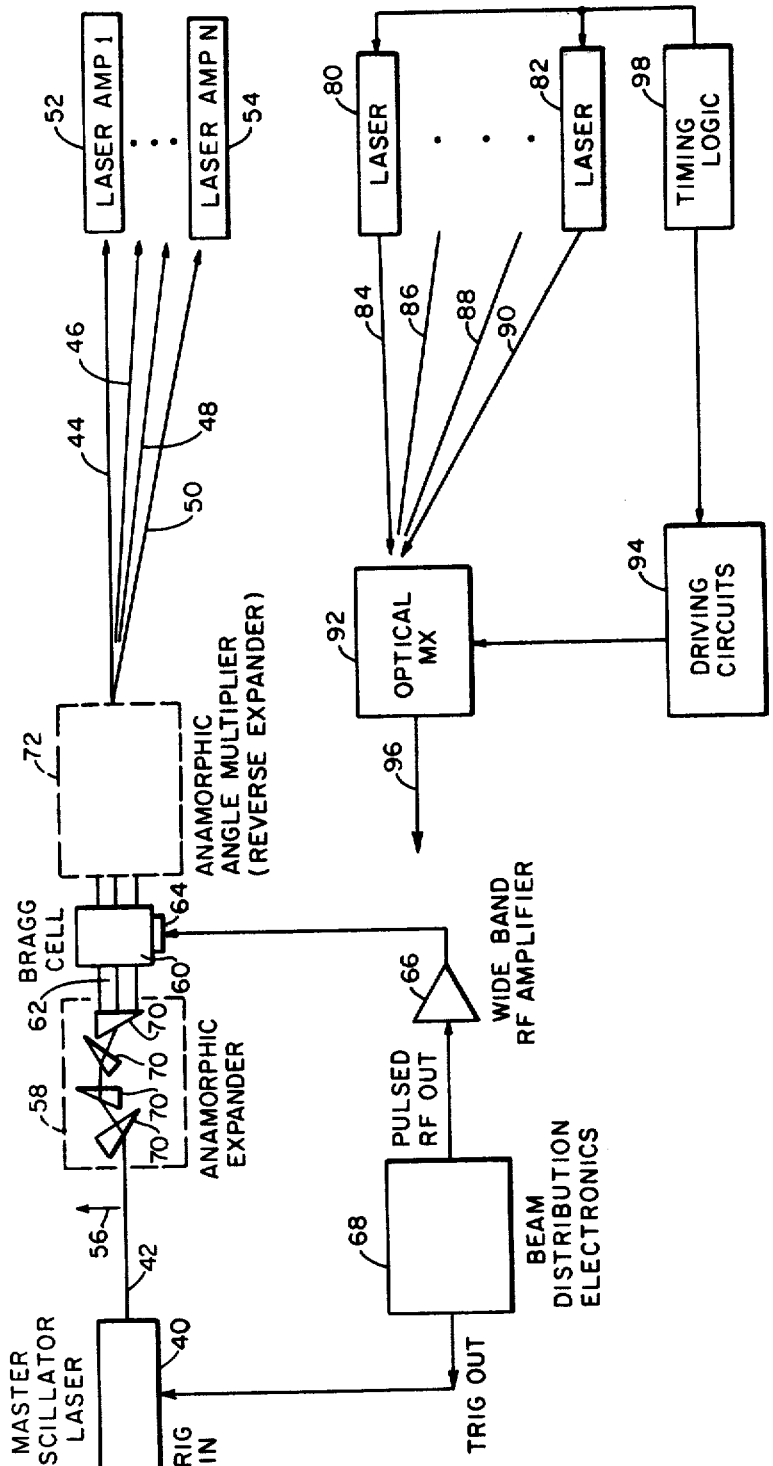

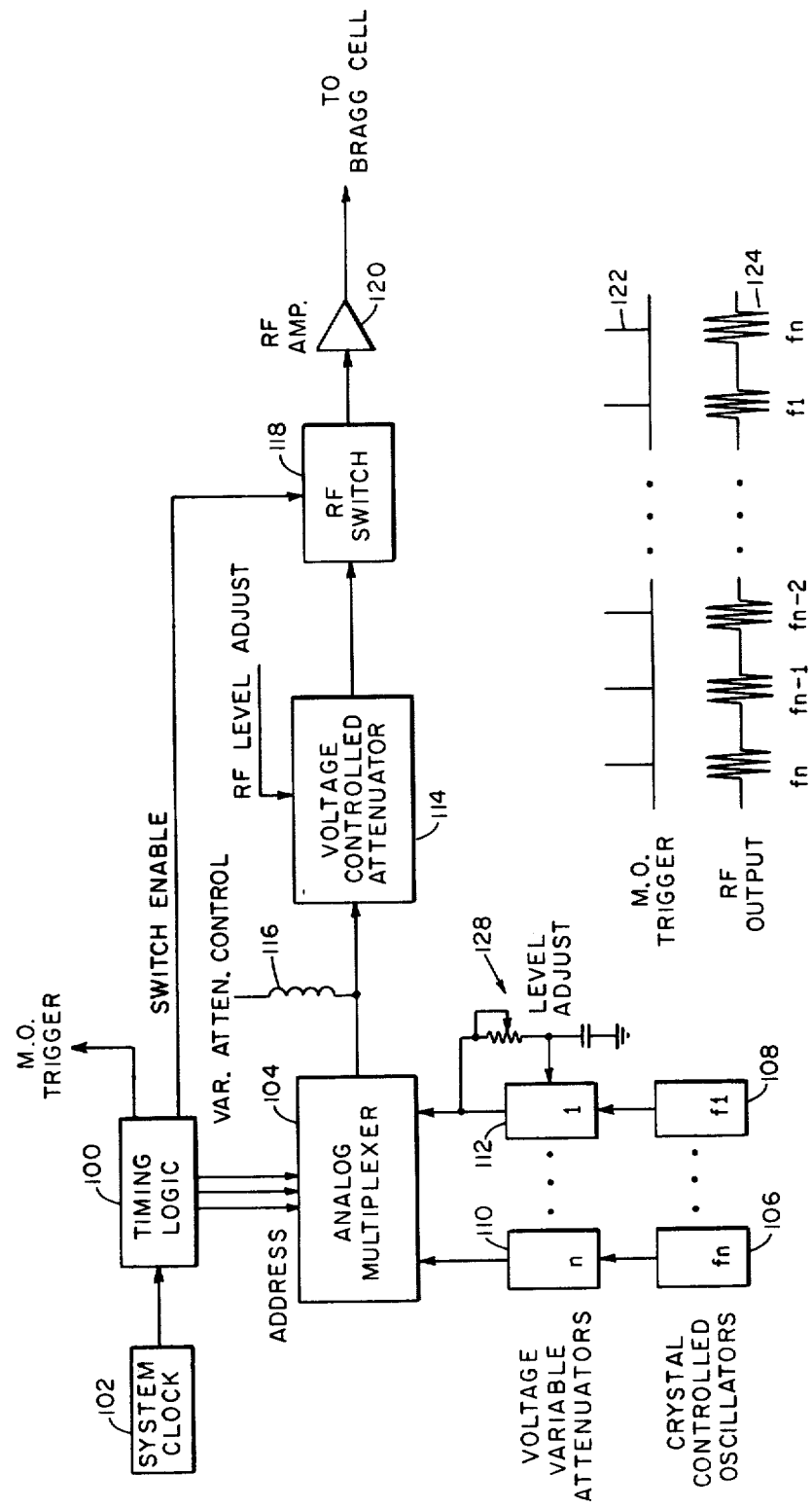

ACOUSTO-OPTIC MULTIPLEXING AND DEMULTIPLEXING

FIELD OF THE INVENTION

The present invention relates to optical multiplexing and demultiplexing systems and in particular to a system employing an acousto-optical element.

BACKGROUND OF THE INVENTION

One of the needs in the technique of isotope separation employing laser beams to produce isotopically selective photoexcitation and ionization is the multiplexing (including combining and/or decombining) of pulsed beams of laser radiation between a common path of high pulse rate and plural distinct paths of relatively lower pulse rate having the pulses distributed amongst the separate paths according to some predetermined sequencing pattern. Such a multiplexing function is desirable to distribute the output of a master oscillator laser operating at a high pulse rate and at a frequency to produce isotopically selective photoexcitation or ionization onto a plurality of distinct separate paths, the radiation of which is amplified in one or more stages. It is desired to employ the output of a single master oscillator to insure wavelength consistency in each amplifier stage, but it is similarly desirable to distribute separate pulses and to thus reduce the pulse rate before amplification to apply the full intensity of each pulse to the amplifiers at a low rate commensurate with high power amplification.

It is also desirable that pulsed radiation paths of relatively low pulse rate be ultimately combined into substantially higher pulse rate beams for application to the uranium vapor where isotopically selective photoexcitation or ionization is accomplished.

BRIEF SUMMARY OF THE INVENTION

In accordance with the teachings of the present invention, a system is disclosed wherein an optical demultiplexing system is provided for distributing radiation of augmented pulse rate typically from a master oscillator onto a plurality of spatially distinct paths of radiation of relatively lower pulse rate and on which the radiation pulses are distributed according to some predetermined sequencing scheme.

The system of the present invention typically employs an acousto-optical element in the nature of a Bragg cell which provides a deflection or diffraction characteristic to input optical radiation, typically of a single frequency, by an amount proportional to each of frequencies of an electrical signal applied to the element. The separate frequencies employed to drive the acousto-optical element may be generated by sequencing the output of a plurality of fixed frequency oscillators, in accordance with a predetermined sequencing pattern, through a high frequency amplification system to drive the element. Alternatively, economy in the number of precision oscillators required may be achieved by employing a frequency comparison technique employing one or more stable oscillators in conjunction with a voltage-controlled oscillator which is sequenced through a set of voltage states to produce a corresponding sequence of output frequencies. One or more of the output frequencies are sampled and compared to the reference frequency from the stable oscillator or oscillators and used to develop an error signal applied to the voltage controlled oscillator. In the manner of a negative feedback loop, long-term oscillator stability is insured and it is then only necessary that oscillator stability over the short-term duration of each repeating sequence need be assured by proper design of the controlled oscillator.

The system may also be operated in reverse to combine radiation from a plurality of spatially distinct beams, on which the pulses occur in a staggered sequence, onto a single path of radiation of augmented pulse rate.

BRIEF DESCRIPTION OF THE DRAWING

These and other features of the present invention are more fully set forth below in the detailed description, presented solely for purposes of illustration and not by way of limitation, and the accompanying drawing of which:

FIG. 1 is a simplified diagram illustrative of the multiplexing concept of the present invention for combining or decombining beams;

FIG. 2 is an optically more detailed view of a system for distributing radiation from single-to-plural paths in accordance with the present invention;

FIG. 3 is a simplified diagram of a system operating to combine beams from plural paths onto a single path;

FIG. 4 is a detailed circuit diagram of driving circuitry for the multiplexing optics of FIGS. 1-3 according to a first embodiment;

FIG. 4A is a timing diagram useful in explaining the operation of the invention.

DETAILED DESCRIPTION OF THE INVENTION

Figure 5:
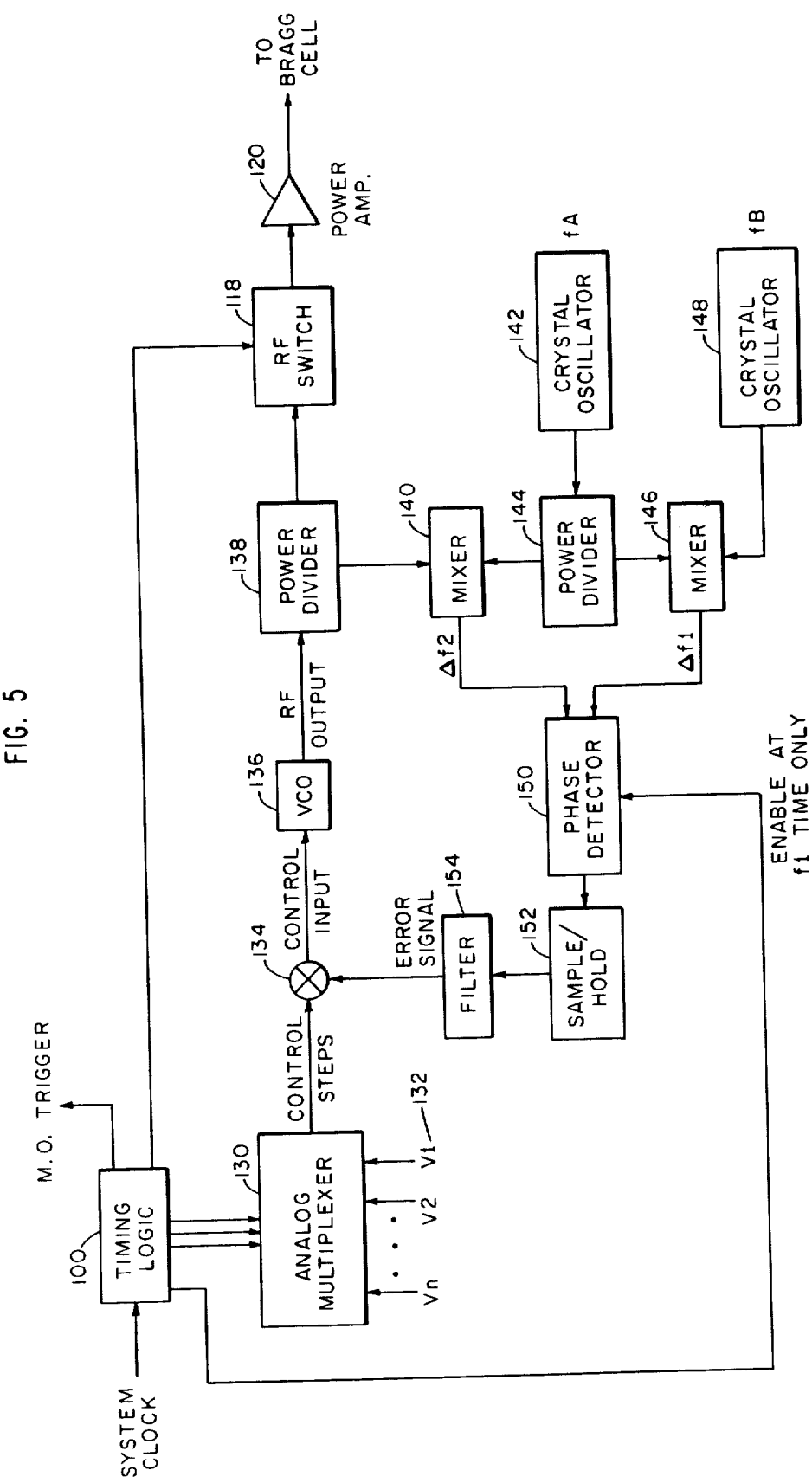
FIG. 5 is a detailed circuit diagram of alternative driving circuitry for the multiplexing optics of the present invention.

The present invention is operative for a multiplexing or demultiplexing optical radiation. An embodiment of the present invention contemplates a system as simplified in the illustration of FIG. 1 for demultiplexing radiation between a single path 12 of augmented pulse rate represented by pulses of radiation 14, 16, 18, 20, 22 and 24 and plural distinct paths 26, 28, 30 and 32 on which pulses occur at a relatively lower pulse rate. The pulses on paths 26–32 are typically staggered in a repeating time sequence, as illustrated, and in which pulses 14, 16, 18 and 20 are respectively distributed amongst the paths 26, 28, 30 and 32. A demultiplexing system 34 is provided for this purpose and typically includes an acoutso-optical element, such as a Bragg cell, driven at a set of distinct frequencies, each corresponding to a different deflection angle represented by the angle formed between the path 12 and each of the plural distinct paths 26, 28, 30 and 32. Multiplexing system 34 may accordingly operate either to combine lower pulse rate radiation from the paths 26–32 onto the path 12 or to distribute (demultiplex) the higher pulse rate from the path 12 onto the distinct separate paths 26–32.

The operation of a distribution system is more fully illustrated with respect to FIG. 2. As shown there, a master oscillator laser 40 is provided, as may typically be found in a system for producing isotopically selective photoexcitation and ionization in the process of uranium enrichment, as is, for example, discussed in U.S. Pat. No. 3,924,937. The master oscillator laser 40 is employed to establish pulse timing and pulse frequency for the isotope separation process, but must be reduced in pulse rate before amplification as is necessary to increase the intensity to a desired level for uranium enrichment. A convenient manner of achieving pulse rate reduction without loss of generated light intensity or frequency control is to distribute radiation existing in an output beam 42 from the master oscillator 40 onto a plurality of distinct paths 44, 46, 48 and 50 which may then each be applied to separate laser amplifiers or stages of amplification 52 . . . 54.

It is preferred that the output beam 42 from the master oscillator 40 be expanded in the direction corresponding to the direction over which the beams are distributed, i.e. direction 56 in the drawing. This is accomplished by a set of optics such as an anamorphic beam expander 58 which effectively expands the beam cross-section in the dimension 56 before application to an acousto-optical element 60, typically a Bragg cell. The resulting expanded beam 62 is applied to acousto-optical device 60 which is driven at a set of RF frequencies through a transducer 64 driven from an RF amplifier 66 by beam distribution electronics 68. The beam distribution electroncs 68 control the pulse timing of the radiation from the master oscillator 40 so as to switch through a set of frequencies in a predetermined sequence, such as the sequence of four repeating patterns illustrated above in FIG. 1. Typically, a greater number than four would be employed for an enrichment plant, but for purposes of illustration, the number four will suffice here.

The Bragg cell 60 may typically be fabricated of a glass substrate serving as an acousto-optical interaction medium. Element 60 is acoustically driven at an RF frequency of longitudinal bulk waves to establish a wave front within the cell which in turn produces a diffraction corresponding to the drive frequency. The Bragg cell must, in order to resolve a predetermined number of output paths, have a beam of predetermined cross-sectional dimension in the direction 56 over which the plural beams are distributed. This may be calculated by known methods such as the relationship whereby the maximum number of resolvable spots is equal to the product of the one-dimensional clear aperture of the Bragg cell parallel to the acoustic wave vector, the frequency bandwidth over which the excitation electrical signal is spread, and a figure of merit reflecting the resolution desired in the separated beams, all divided by the acoustic velocity through the Bragg cell material. This formula establishes the magnitude of the clear aperture which is the beam dimension in the direction 56 necessary to produce resolution in the separate paths at the specified resolution criteria.

This expansion is achieved in the expander 58 of the system illustrated in FIG. 2 through a set of prisms 70, each acting to expand the beam in the direction 56 a predetermined amount with accumulative expansion of the desired magnitude. The prisms 70 are typically oriented to receive optical radiation at Brewster's angle, for which the polarization in beam 42 prevents reflection at the interface, and to exit the prism at a surface having an antireflective coating. Other beam expansion systems may be employed, such as cylindrical telescopes, or antireflective coated prisms oriented at other than Brewster's angle as desired.

Once the beam has been sequentially deflected onto a predetermined distribution pattern, it is then desired to compress it to the original dimension. This function is provided by an anamorphic angle multiplier 72 which operates in the reverse manner of the expander 58 using the same or similar components.

The system of the present invention may also be operated in the reverse, as illustrated in FIG. 3, to take the output, for example, from a plurality of lasers 80 . . . 82 on a plurality of distinct paths 84, 86, 88 and 90 and to combine them through an optical multiplexing system 92 driven by an electrical driving circuit 94 onto a single output path 96. A timing system 98 is typically provided to activate the lasers 80 . . . 82 to sequence the pulses between the paths 84-90 such that they occur in a repeating pattern of staggered pulses, as is described above. In the operation for combining illustrated in FIG. 3, the optical multiplex system 92 can typically contain the same elements as illustrated above in FIG. 2, that is anamorphic elements 58 and 72 and cell 60. Also, the driving circuits 94 will be the same as the distribution electronics 68 and amplifier 66 illustrated with respect to FIG. 2. The timing logic circuit 98 will be different only to the extent that it provides a plurality of outputs to trigger the lasers 80 . . . 82 in the repeating time sequence as opposed to having a unitary trigger pulse train of augmented frequency, as illustrated in FIG. 2.

The details of the electronic circuits for providing the beam distribution or combination functions may now be more fully described with respect to FIGS. 4 and 5. By reference first to FIG. 4, there is illustrated a master timing logic system 100 which receives a clock input from a system clock 102 and establishes the trigger output to the master oscillator and provides a pattern of switching signals as, for example, through a counter, to an analog multiplexer circuit 104. Multiplexer circuit 104 receives a set of inputs from a plurality of crystal-controlled oscillators 106 . . . 108 through a corresponding set of variable attenuators 110 . . . 112. The attenuators 110 . . . 112 are provided to equalize the amplitudes from each oscillator so that as ultimately applied to the Bragg cell they can be adjusted for peak efficiency, as is known in the art. The multiplexer 104 sequentially selects the output of the attenuators 110 . . . 112 in accordance with the logic states of the address signal applied to it from the timing logic circuit 100. The output of the multiplexer 104 is applied to a voltage-controlled attenuator 114. The voltage attenuators 110 . . . 112 provide additional isolation between channels of the multiplexer by means of the low frequency path of inductor 116 through the multiplexer to the level adjust circuitry 128. The voltage-controlled attenuator 114 is provided to simultaneously adjust the RF level of all oscillators and responds to a DC control current for this purpose.

The output of the attenuator 114 is applied to an r.f. switch 118 which is triggered by signals from the timing logic circuit 100 coincident which each master oscillator laser pulse and centered about the output peak from the master oscillator. It is limited in time duration in order to reduce the duty cycle on the Bragg cell. The output of the RF switch 118 is then applied to an RF amplifier 120. The RF signals employed are typically in the range of 1 to 100 MHz.

In FIG. 4A, a typical timing sequence of master oscillator output pulses 122 is illustrated in time comparison to the sequence of distinct frequency outputs provided from the RF amplifier 120 and illustrated as a repeating set of frequency bursts 124.

By reference now to the illustration of FIG. 5, there is shown an alternative form for the beam distribution electronics. In this case, an analog multiplexer 130 is provided to receive the pattern-switching signals from the timing logic circuit 100 and to switch a selected set of different fixed voltages 132 through a summing amplifier 134 to a voltage-controlled oscillator 136. The output of the voltage-controlled oscillator 136 is thus caused to change in frequency in accordance with the applied voltage magnitudes and with a timing pattern specified by the timing logic circuit 100. The voltage-controlled oscillator 136 will also typically operate in the RF range of 1 to 100 MHz and provide its frequency switched output through a power divider 138 which divides the signal onto a first path to the RF switch 118 operating, as indicated before, in FIG. 4 and sequentially to the power amplifier 120. The remaining power in the RF output divided by the power divider 138 is applied to a mixer 140. The mixer 140 receives the output of a crystal controlled oscillator 142, operating at a first frequency, through a power divider 144 which similarly applies the same frequency to a further mixer 146. The mixer 146 also receives the output of a second crystal controlled oscillator 148 operating at a second frequency. The mixer 146 provides an output representing the difference in frequency between the first and second frequencies of the oscillators 142 and 148, while the mixer 140 provides an output representing the frequency difference between the RF output of the voltage-controlled oscillator 136 and the output of the oscillator 142. The outputs of the two mixers 140 and 146 are applied to a phase detector 150 which provides an output proportional to the phase difference between the two signals to a sample and hold circuit 152. The sampled signal is applied through a low pass filter 154 to a negative feedback input of the summing circuit 134 as an error signal. The frequency of the oscillators 142 and 148 are made to differ by an amount corresponding to the difference between the frequency of the oscillator 142 and one frequency from the voltage-controlled oscillator 136. The phase detector 150 is controlled by the timing logic 100 to be enabled for phase comparison only during the interval when that one frequency is provided by the voltage-controlled oscillator 136. In this manner, a phase-locked loop is established to control the voltage-controlled oscillator 136 to insure that the two outputs of the mixers 140 and 146 are the same. Therefore, by providing accurate frequencies for the oscillators 142 and 148 long-term stability of the entire frequency sequencing system is established. It is then only necessary to insure that the voltage-controlled oscillator 136 and the magnitude of the input voltages to the analog multiplexer 130 are sufficiently well defined for short-term stability and precision in the repeating sequence of frequencies applied to the Bragg cell.

The above-described preferred embodiment is presented for illustrative purposes only, it being intended that modifications and alterations to the disclosed preferred embodiment fall within the scope of the invention as defined in the following claims.

What is claimed is:

1. A system for transmitting pulsed radiation between a common path of relatively high pulse rate and a plurality of spatially separate paths having radiation of relatively lower pulse rate with the pulses time-sequenced between the plural, spatially separate paths in a predetermined pattern, said system comprising:
    means for producing a deflection in a beam of electromagnetic radiation corresponding to a characteristic of a signal applied thereto and placed between said common path and said plurality of spatially distinct paths;
    means for applying a signal to said deflection producing means having a repeating set of distinct ones of said signal characteristics to produce a repeating sequence of different deflection characteristics corresponding to the repeating sequence of radiation pulses on said plural spatially separate paths whereby radiation is transmitted between said common path and said plural spatially separate paths in accordance with said predetermined pattern;
    means for providing a sequence of pulses of laser radiation upon said common path whereby said pulses are distributed onto said plural separate paths; and
    means for applying the laser radiation provided on said plurality of spatially separate paths to a corresponding plurality of radiation amplifiers.

2. The system of claim 1 further including:
    means for providing a sequence of pulses of laser radiation upon said common path whereby said pulses are distributed onto said plural separate paths; and
    means for applying the laser radiation provided on said plurality of spatially separate paths to a corresponding plurality of radiation amplifiers.

3. The system of claim 1 wherein said means for providing said plurality of pulses on said common paths includes a laser master oscillator.

4. The system of claim 1 wherein said applying means further includes:
    a plurality of sources of distinct frequencies of electrical oscillation;
    means for applying the signals from said plurality of sources sequentially to said deflection producing means in a sequence corresponding to said predetermined pattern.

5. The system of claim 1 further including means for causing the radiation passing between said common path and said plural, spatially distinct path to traverse said deflection producing means expanded in the dimension over which said plural paths are spatially distinct.

6. The system of claim 5 wherein said means for causing expanded traversal includes an anamorphic beam expander and an anamorphic angle multiplier.

7. The system of claim 1 wherein said deflection producing means includes an acousto-optic device.

8. The system of claim 7 wherein said applying means includes means for producing an oscillating signal having a set of frequencies corresponding to the deflection range between said common path and said plurality of spatially distinct paths.

9. A system for transmitting pulsed radiation between a common path of relatively high pulse rate and a plurality of spatially separate paths having radiation of relatively lower pulse rate with the pulses time-sequenced between the plural, spatially separate paths in a predetermined pattern, said system comprising:
    means for producing a deflection in a beam of electromagnetic radiation corresponding to a characteristic of a signal applied thereto and placed between said common path and said plurality of spatially distinct paths;
    means for applying a signal to said deflection producing means having a repeating set of distinct ones of said signal characteristics to produce a repeating sequence of different deflection characteristics corresponding to the repeating sequence of radiation pulses on said plural spatially separate paths whereby radiation is transmitted between said common path and said plural spatially separate paths in accordance with said predetermined pattern;

a plurality of sources of laser radiation each applying time staggered pulses of laser radiation to said plurality of spatially separate radiation paths whereby the pulses are combined onto said common path with increased pulse rate.

10. The system of claim 9 wherein said applying means further includes:

a plurality of sources of distinct frequencies of electrical oscillation;

means for applying the signals from said plurality of sources sequentially to said deflection producing means in a sequence corresponding to said predetermined pattern.

11. The system of claim 9 further including means for causing the radiation passing between said common path and said plural, spatially distinct paths to traverse said deflection producing means expanded in the dimension over which said plural paths are spatially distinct.

12. The system of claim 11 wherein said means for causing expanded traversal includes an anamorphic beam expander and an anamorphic angle multiplier.

13. The system of claim 9 wherein said deflection producing means includes an acousto-optic device.

14. The system of claim 13 wherein said applying means includes means for producing an oscillating signal having a set of frequencies corresponding to the deflection range between said common path and said plurality of spatially distinct paths.

15. A system for transmitting pulsed radiation between a common path of relatively high pulse rate and a plurality of spatially separate paths having radiation of relatively lower pulse rate with the pulses time-sequenced between the plural, spatially separate paths in a predetermined pattern, said system comprising:

means for producing a deflection in a beam of electromagnetic radiation corresponding to a characteristic of a signal applied thereto and placed between said common path and said plurality of spatially distinct paths;

means for applying a signal to said deflection producing means having a repeating set of distinct ones of said signal characteristics to produce a repeating sequence of different deflection characteristics corresponding to the repeating sequence of radiation pulses on said plural spatially separate paths whereby radiation is transmitted between said common path and said plural spatially separate paths in accordance with said predetermined pattern;

means for providing a repeating sequence of bursts of electrical oscillation of differing frequency to said means for producing deflection;

means for sampling the signal applied to said deflection producing means at a selected one of said plurality of frequencies;

a frequency standard means for comparing the frequency of the sampled signal against said standard;

means for developing a signal representative of deviation from the sampled frequency against said standard; and means for adjusting each of said plurality of frequencies in response to the sampled deviation throughout the subsequent sequence of repeating frequencies.

* * * * *